United States Patent

[11] 3,552,520

| [72] | Inventor | Henry Naubereit<br>Cherry Hill, N.J. |
|---|---|---|
| [21] | Appl. No. | 710,702 |
| [22] | Filed | Feb. 27, 1968 |
| [45] | Patented | Jan. 5, 1971 |
| [73] | Assignee | the United States of America as represented by the Secretary of the Navy |

[54] DETECTING AND TRANSMITTING SYSTEM WITH INTERVAL TIMING MEANS
23 Claims, 4 Drawing Figs.

[52] U.S. Cl. .................................................. 181/0.5,
340/15, 340/148
[51] Int. Cl. ...................................................... G01l 1/08
[50] Field of Search........................................... 340/15,
161, 148; 181/0.5H

[56] References Cited
UNITED STATES PATENTS
3,373,526  3/1968  Parkin.......................... 181/0.5

*Primary Examiner*—Rodney D. Bennett, Jr.
*Assistant Examiner*—William T. Rifkin
*Attorneys*—Henry Hansen, E. J. Brower and B. Frederick Buchan, Jr.

ABSTRACT: A detector provides a signal for switching on the power supply of a proximately positioned transmitter upon the detection of desired information. A signal representative of the desired information is transmitted and, at predetermined times thereafter, coded signature signals are produced for transmission, these latter signals being supplied by a code generator upon the receipt thereto of pulses from a one-shot and/or repetitive interval timer. The system consumes no power in the standby mode.

PATENTED JAN 5 1971  3,552,520

INVENTOR.
HENRY NAUBEREIT
BY
ATTORNEY

3,552,520

DETECTING AND TRANSMITTING SYSTEM WITH INTERVAL TIMING MEANS

The invention described herein may be manufactured and used by or for the Government of the United States of America for governmental purposes without the payment of any royalties thereon or therefor.

BACKGROUND OF THE INVENTION

The invention relates to a detecting apparatus for receiving acoustic signals and for transmitting selected portions thereof and more particularly to a network of electrical circuit elements which, upon the selective extraction of desired information from a wide band of frequencies having associated therewith random or other background noise, provide signals indicative of the desired information and, at predetermined times thereafter, provide signature signals such that a listener may identify the source of transmission and the nature of the transmitted information.

The present invention is contemplated for use as an electronic spy to listen for and activate means for transmitting signals indicative of vehicle and/or troop movements as well as button bomb detonations, rifle fire, and the like. The invention may be secreted behind enemy lines and, once so secreted, may be unrecoverable. Consequently, it is paramount that transmission be kept at a minimum to both conserve power and avoid detection by the enemy. It is also paramount that information, when transmitted, may reasonably be assumed to contain desired information rather than mere random noise. In addition, as it is contemplated that a plurality of devices comprising the invention will be deployed in a predetermined pattern over a wide area, it is important that the listener know which one (or ones) of the devices is transmitting.

SUMMARY OF THE INVENTION

Accordingly, it is the general purpose of this invention to provide an acoustic detector and signal transmitter capable of detecting vehicle and troop movements and/or button bomb detonations or the like and for transmitting signals indicative thereof and in response thereto along with providing coded signature signals at predetermined time intervals to identify the transmitting source and the nature of the transmitted information.

In brief, an acoustic sensor receives a composite signal composed of both desired information and background noise. This composite signal is fed into a background insensitive amplifier which selectively feeds back only the background information, thereby allowing the unattenuated passage of the desired information to a transmitter for radiation thereby. Appropriate detecting circuitry provides signals indicative of the desired information to enable a switch which, upon closure, completes a circuit path for the transmitter power supply. The power supply concurrently feeds the transmitter and supplies power to two timing networks which provide electronic pulses at predetermined times to a code generator for utilization thereby to initiate a code signal signature transmission process.

DESCRIPTION OF THE PREFERRED EMBODIMENT

Figure 1:
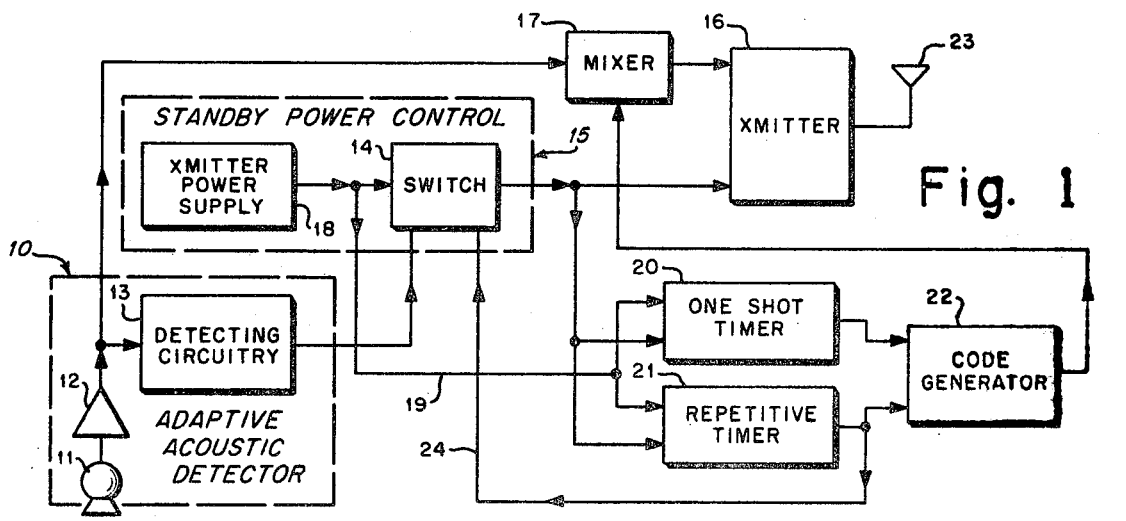
FIG. 1 is a block diagram of the system showing the various elements thereof in accordance with the invention.

Referring now to the drawing and more particularly to FIG. 1, there is shown an adaptive acoustic detector 10 in accordance with and more fully explained in Pat. application, Ser. No. 679,255, entitled, "Adaptive Acoustic Detector Apparatus" by Henry Naubereit et al., filed Oct. 30, 1967, having at its input an acoustic sensor 11, which may be a microphone. The sensor 11 is connected to a background insensitive amplifier shown generally at 12. The output from amplifier 12 is fed both to a transmitter 16 through a mixer 17 and to appropriate detecting circuitry 13. As disclosed in the above-mentioned patent application, the detecting circuitry 13 provides an output signal only when the signal received by sensor 11 contains desired information, such as the sound of vehicle movement. Should no such signal be provided, switch 14, positioned within the standby power control unit 15 and connected to the transmitter power supply 18, is nonoperative. Thus, while the transmitter 16 continuously receives information from amplifier 12 through mixer 17, the absence of a signal from detecting circuitry 13 prevents the closure of the switch 14 and hence precludes the transmitter power supply 18 from supplying its DC power to the transmitter 16. In this way, transmitter power is conserved, no power being consumed by the system in the standby mode. That is, power is consumed only upon the enabling of switch 14, a condition which occurs only upon the receipt and detection of desired information by adaptive acoustic detector 10.

The switch 14, in addition to being electrically connected to the transmitter power supply 18, is also electrically connected to two timing elements, a one-shot timer 20 and a repetitive timer 21. The outputs of one-shot timer 20 and repetitive timer 21 are connected to a code generator 22 which, in response to signals received from the timers (in a manner hereinafter explained), provides a signal to mixer 17 and thence to transmitter 16. The mixer 17 is of the type that will pass information from background insensitive amplifier 12 in the absence of a coded signature signal from code generator 22 and will pass the sum of the two signals in the presence of a coded signature signal. Both coded and uncoded information is radiated by antenna 23.

The operation of the system of FIG. 1 will now be described. As stated heretofore, if the detecting circuitry 13 does not provide an output signal, then even though the background insensitive amplifier 12 is providing a signal to transmitter 16, the power supply 18 thereof is inoperative to supply power due to the "OFF" condition of switch 14 and hence no signal is radiated by antenna 23. If, however, the detecting circuitry 13 does supply a signal, the switch 14 is rendered operative to thereby permit the passage of voltage from transmitter power supply 18 to the transmitter 16. Concurrently therewith, the supply 18 provides DC voltage to both the one-shot timer 20 and the repetitive timer 21 through the electrical connection 19. One-shot timer 20 is designed, as hereinafter disclosed, to provide a pulse 3.0 seconds after the closure of switch 14. This pulse is fed into the code generator 22 which, in response thereto, provides a coded signal to mixer 17. If the information from background insensitive amplifier 12 of the adaptive acoustic detector 10 persists for a period greater than 3 seconds, the signature signal from code generator 22 mixes therewith in mixer 17 and the composite signal is supplied to transmitter 16 for radiation by antenna 23. Conversely, if the signal from the background insensitive amplifier 12 persists for less than 3 seconds, the signature signal from code generator 22 will be passed by the mixer 17 directly to the transmitter 16 for radiation thereby.

It is noted that regardless of the duration of the signal from background insensitive amplifier 12, or the duration of the signal from the detecting circuitry 13, the switch 14 remains operative, once so rendered, until it receives a reset pulse via line 24 from repetitive timer 21. This will be hereinafter described.

The transmitter power supply 18 also feeds the repetitive timer through the electrical conductor 19. Repetitive timer 21 is designed to provide an output signal 10.0 seconds after the receipt of power from the supply 18. The signal from repetitive timer 21 is fed concurrently to the code generator 22 and, via electrical conductor 24, back to switch 14. The code generator, in response to the signal received from the repetitive timer 21, provides a signal to the mixer 17 in the same fashion as provided upon receipt of a signal from one-shot timer 20. The signal from the code generator 22, in response to the signal produced by repetitive timer 21, is radiated by the antenna 23 either as part of a composite signal or merely the code signal itself in a manner identical with the radiation of the signal from one-shot timer 20 and the output signal from background insensitive amplifier 12.

The signature signal from code generator 22, in response to repetitive timer 21, occurs 7.0 seconds after the signature signal responsive to the signal supplied by one-shot timer 20. If, for example, a line of troops passes by the sensor 11 in a period between 3.0 and 10.0 seconds, then the first signature signal from code generator 22 will mix with the signal supplied by background insensitive amplifier 12 and a composite signal will be radiated by antenna 23. The signature signal supplied as a result of the receipt of a signal from repetitive timer 21, however, will not mix in the mixer 17 and will instead be directly radiated by antenna 23. In this way the listener knows not only which of the strategically positioned devices is transmitting (as identified by the particular code signal transmitted) but also the length of time, within rather narrow limits, that a desired target is within the range of the sensor 11.

Once the switch 14 is closed, the transmitter remains "ON" until the power supply 18 is disconnected therefrom by the disabling of switch 14. The reset pulse provided at 10 second intervals by the repetitive timer 21 via line 24 attempts to reset or disable the switch 14 once every 10 seconds. However, the switch 14 is of a type such that it can not be reset in the presence of a signal from the detecting circuitry 13. Thus, as long as the sensor 11 of FIG. 1 is receiving a desired target signal, the transmitter 16 will remain ON. Upon the occurrence of the absence of a desired signal at sensor 11, however, the transmitter 16 remains ON for the conclusion of the 10 second cycle whereupon, the detecting circuitry 13 no longer providing a signal to switch 14, the reset pulse from the timer 21 is operative to disable the switch 14 and thereby disconnect the power supply 18 from the transmitter 16.

It is noted that the switch 14 is provided with a time-delay circuit of sufficient duration to insure that the signature signal from code generator 22 (as derived from repetitive timer 21) will be radiated by the antenna 23 prior to the disabling of the switch 14 upon receipt of a reset pulse. This can more clearly be shown upon reference to FIG. 2.

Figure 2:
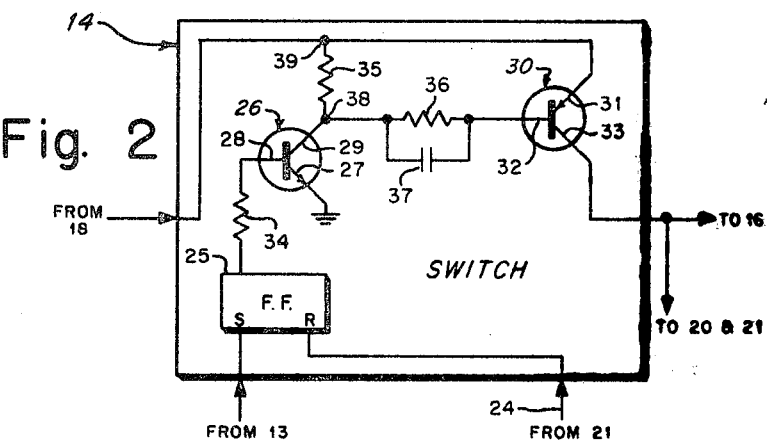
FIGS. 2—4, inclusive, are schematic diagrams of certain of the block diagram elements of FIG. 1.

Referring now to FIG. 2 there is shown the switch 14 comprising a conventional flip-flop 25 having set S and reset R inputs; an NPN transistor 26 having an emitter 27, a base 28 and a collector 29; and a PNP transistor 30 having an emitter 31; a base 32; and a collector 33. The output from flip-flop 25 is connected to the base 28 through a resistor 34. The emitter 27 is grounded while the collector 29 is connected to the transmitter power supply 18 through a resistor 35. Collector 29 is also connected both to the emitter 31 and base 32 of the transistor 30, the latter connection being through a time-delay network comprising the parallel combination of a resistor 36 and a capacitor 37 and joined at point 38 on the collector 29. As can be seen from the FIG., the collector 33 of transistor 30 provides an output signal concurrently to the transmitter 16 and to the two timers 20 and 21. The operation of the circuit of FIG. 2 will now be described.

DC voltage from the transmitter power supply 18 is applied to one side of the resistor 35 and to the emitter of transistor 30. However, neither transistor 30 nor transistor 26 is rendered conductive as no voltage is supplied to the respective bases 32 and 28 of the two transistors. In this condition, the system is in the standby mode. Upon the receipt of a signal at the set S input of flip-flop 25, supplied by the detecting circuitry 13, the flip-flop 25 provides an output signal which results in a positive voltage being developed across resistor 34. This positive potential at the base 28 of transistor 26 supplies the initial base current for the transistor 26 and, as the base 28 is now more positive than the emitter 27, the transistor 26 is rendered conductive. Upon conduction being achieved, power from transmitter power supply 18 flows through the resistor 35, through the transistor 26, and to ground through emitter 27. As power flows through the resistor 35 and a voltage develops thereacross, the voltage at point 38 decreases with respect to the voltage at a point 39 on the other side of resistor 35. Consequently, the base 32 of PNP transistor 30 is rendered more negative than the emitter 31 thereof with the result that the transistor 30 is rendered conductive to supply power from power supply 18 through its collector 33 to the transmitter 16, one-shot timer 20, and repetitive timer 21. The time delay network comprising resistor 36 and capacitor 37 delays the transmission of power from the point 38 to the base 32 of the transistor 30 for a period of time sufficient to allow the code generator 22 to provide a signal to the mixer 17 prior to the disabling of switch 14 upon the application of a reset pulse at the reset terminal R from repetitive timer 21.

Figure 3:
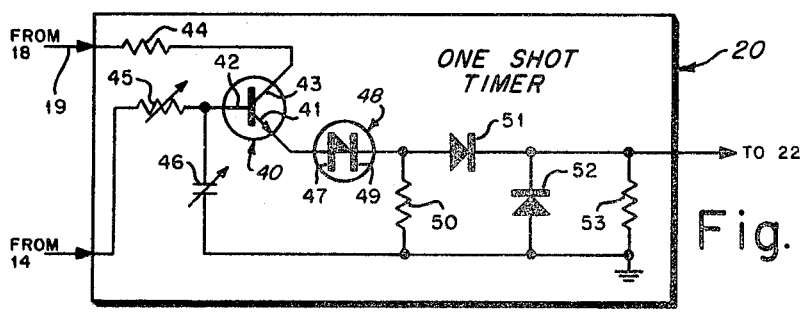

Referring now to FIG. 3, the operation of the one-shot timer 20 will be described. The timer 20 comprises an NPN transistor 40 having an emitter 41, a base 42 and a collector 43. The collector 43 is connected to the transmitter power supply 18 through a resistor 44. The base 42 is connected to the switch 14 (and hence to the power supply 18) through a variable resistor 45. The base 42 is also connected to ground through a variable capacitor 46. The emitter 41 is connected to the anode 47 of a four-layer diode device 48. The cathode 49 thereof is connected to a resistor 50 and a pulse shaping network comprising diodes 51 and 52 and resistor 53. The output to the code generator 22 is taken at one side of the resistor 53.

In the standby mode, power from transmitter power supply 18 develops a voltage across resistor 44 and hence upon the collector 43 of the transistor 40. However, the base 42 receives no signal and hence the transistor 40 is quiescent. Upon the receipt of a signal from detecting circuitry 13, however, switch 14 is rendered operative and power from the supply 18 flows through the switch 14 and charges the variable capacitor 46 at a rate determined by the ohmic value of variable resistor 45. The values of the resistor 45 and the capacitor 46 are preselected to provide a time delay of 3.0 seconds before sufficient voltage is developed across the capacitor 46 such that it will discharge through the base 41 of transistor 40. Upon capacitor 46 discharging, the transistor 40 is rendered conductive and power is conducted through the collector resistor 44 and the transistor itself to overcome the breakdown voltage of four-layer diode 48. This results in a sharp, positive going impulse or spike developed across the resistor 50. This spike is shaped by the diodes 51 and 52 such that a relatively square pulse is developed across resistor 53 which is then fed into the code generator 22 thereby initiating the code signature signal process.

It is noted that the ohmic value of the resistor 44 is selected to provide a sustaining current for the four-layer diode 48 so that even though capacitor 46 may be continually charging and discharging at three-second intervals, no further output pulse from the timer 20 occurs. Thus, regardless of the duration of the signal received by the sensor 11 of FIG. 1, the one-shot timer 20 provides but one pulse to the code generator 22, this pulse being provided three seconds after the enabling of switch 14.

Figure 4:
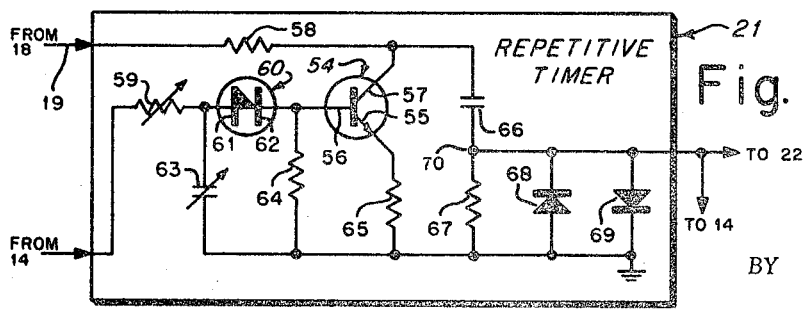

The operation of the repetitive timer 21 will now be described. With reference to FIG. 4, there is shown an NPN transistor 54, similar to transistor 40 of FIG. 3, having an emitter 55, a base 56 and a collector 57. The collector is connected to the power supply 18 through a resistor 58. The base 56 is connected to the switch 14 through a variable resistor 59 and a four-layer diode 60 having an anode 61 and a cathode 62. The anode 61 is connected both to one side of a variable resistor 59 and to a variable capacitor 63, the other side of the capacitor 63 being connected to ground. The cathode 62 is connected to the base 56 of the transistor 54 and to ground through a resistor 63. The emitter 55 of transistor 54 is connected to ground through a resistor 65 while the collector 57 is connected to one side of a capacitor 66, the other side of capacitor 66 being connected both to a resistor 67 and the respective anode and cathode of two diodes 68 and 69. The combination of elements comprising capacitor 66 and diodes 68 and 69 provide a pulse-shaping function which in conjunction with the resistor 67 provides a sufficiently wide and shaped pulse for supplying the code generator 22 with a signal upon which it can trigger.

Transmitter power supply 18 supplies a DC voltage to the collector 57 through the resistor 58. However, as no signal is applied to the base 56, the transistor 54 is quiescent. In addition, this voltage is blocked by the capacitor 66. Accordingly, the repetitive timer 21 consumes no power in this, the standby mode. Upon the receipt of a signal from detecting circuitry 13, however, switch 14 is rendered operative and voltage from the supply 18 is passed through the switch 14 to charge the variable capacitor 63 at a rate determined by the resistance of variable resistor 59. The values of the resistor 59 and capacitor 63 are preselected to provide a time delay of 10.0 seconds before the breakdown potential of four-layer diode 60 is reached such that the latter element will conduct. Upon this potential being achieved, the capacitor 63 discharges through the diode 60 and the resultant electrical signal is applied to the base 56 and is operative to render the transistor 54 conductive. Upon conduction, a pulsed voltage signal is supplied across the capacitor 66 and the resistor 67, a voltage division being affected at point 70. The portion of the signal across the capacitor 66 is pulse shaped by the diodes 68 and 69 to concurrently provide an output pulse to the switch 14 and the code generator 22.

It is noted that the variable resistor 59 is selected to be large enough to limit the current through the four-layer diode 60 such that that current is less than the required sustaining current for the device. Accordingly, the diode 60 is able to reset for another cycle, the cycle time being dependent upon the values of the resistor 59 and the capacitor 63. Thus the repetitive timer 21 supplies a signal to the code generator 22 and a reset signal to the switch 14 at ten second intervals. The switch 14 is not disabled, however, so long as a signal is present at the set S input of flip-flop 25. Upon the occurrence of the absence of such a signal, the reset pulse is operative to open the switch 14 and thereby disengages the transmitter 16 from its power supply 18.

Obviously many modifications and variations of the present invention are possible in the light of the above teachings. It is therefore to be understood that within the scope of the appended claims the invention may be practiced otherwise than as specifically described.

I claim:

1. An apparatus for detecting and transmitting acoustic information comprising:
    detecting means for detecting an acoustic signal and providing at a first output terminal a first signal indicative of the detected acoustic signal and at a second output terminal a second signal indicative of predetermined characteristics of the detected acoustic signal;
    transmitting means for transmitting information indicative of the acoustic signal connected to the first output terminal for receiving as an input signal said first signal of said detecting means;
    power supply means for supplying power to said transmitting means; and
    switching means interposed and connected between the second output terminal of said detecting means, an output terminal of said power supply means and an input terminal of said transmitting means for preventing the radiation of said information from said transmitting means in the absence of said second signal from said second output terminal of said detecting means.

2. An apparatus for detecting and transmitting acoustic information comprising:
    detecting means for detecting an acoustic signal and having at least a first and a second output terminal;
    transmitting means for transmitting a signal connected to the first output terminal of said detecting means;
    power supply means for supplying power to said transmitting means;
    switching means interposed and connected between the second output terminal of said detecting means, an output terminal of said power supply means and an input terminal of said transmitting means for preventing the radiation of information from said transmitting means in the absence of a signal emanating from said second output terminal of said detecting means; and
    means interposed between said switching means and said transmitting means for providing a signal to said transmitting means at predetermined times after the receipt of a signal by said switching means emanating from said second output of said detecting means.

3. Apparatus according to claim 2 wherein said means interposed between said switching means and said transmitting means comprises:
    timing means for providing an electrical pulse at predetermined times after said switching means receives a signal emanating from the second output of said detecting means; and
    code generator means for supplying a coded signature signal to said transmitting means upon the receipt of said electrical pulse from said timing means.

4. The apparatus according to claim 3 wherein said timing means comprises:
    a first timer adapted to provide but one pulse a predetermined time after the receipt thereby of a signal emanating from said switching means; and
    a second timer adapted to repetitively provide a pulse at fixed predetermined time intervals.

5. Apparatus according to claim 4 wherein said second timer provides a signal to disable said switching means.

6. Apparatus according to claim 4 wherein said pulse provided by said first timer occurs a predetermined time before the first of said repetitive pulses provided by said second timer.

7. Apparatus according to claim 1 wherein said switching means comprises:
    first transistor means for receiving said second signal and providing at an output terminal a control signal; and
    second transistor means electrically connected between said power supply means and said transmitting means and further connected with said output terminal of said first transistor means for conducting upon the receipt of said control signal from said first transistor means.

8. An apparatus for detecting and transmitting acoustic information comprising:
    detecting means for detecting an acoustic signal having at least a first and a second output terminal;
    transmitting means connected to the first output terminal of said detecting means;
    power supply means for supplying power to said transmitting means;
    switching means for preventing the radiation of information from said transmitting means in the absence of a signal emanating from said second output terminal of said detecting means;
    said switching means including a first means connected to said second output terminal of said detecting means for receiving a signal to be switched;
    said switching means including a second means electrically connected with an output terminal of said first means and being interposed and connected between an output terminal of said power supply means and an input terminal of said transmitting means for being rendered conductive upon the receipt of an electrical signal from said first means; and
    said switching means including a time delay means interposed between the output terminal of said first means and the input terminal of said second means for delaying said electrical signal from said first means to said second means for a predetermined period of time.

9. Apparatus according to claim 7 further including a flip-flop electrically connected to said first means for applying a signal to the input thereof thereby to render said first means conductive.

10. Apparatus according to claim 7 wherein:
said first means and said second means include transistors; and
a resistor is connected at one end thereof to the collector terminal of the first transistor and at the other end thereof to the emitter terminal of the second transistor.

11. Apparatus according to claim 10 wherein:
a first resistor is connected at one end to the collector terminal of said first transistor and is connected at the other end thereof to the base of said second transistor; and
a capacitor is connected across said first resistor.

12. Apparatus according to claim 11 wherein:
a second transistor is connected between the base of said first transistor and the output terminal of a flip-flop; and
the emitter of said first transistor is connected to ground.

13. Apparatus according to claim 12 wherein said first and said second transistors are of opposite polarity.

14. Apparatus according to claim 4 wherein said first timer comprises:
time delay means adapted to provide an electrical signal a predetermined time after the receipt thereby of a first input electrical signal; and
pulsing means connected with and responsive to said time delay means for providing an output pulse.

15. Apparatus according to claim 14 wherein said pulsing means includes:
a four-layer diode; and
a transistor having its base connected to said time delay means and its emitter connected to one side of said four-layer diode, said transistor being rendered conductive upon the receipt of said electrical signal from said time delay means.

16. Apparatus according to claim 15 wherein:
a first resistor is connected between ground and the other side of said four-layer diode; and
a pulse-shaping network is connected across said first resistor.

17. Apparatus according to claim 16 further including a second resistor for receiving a second input signal at one end thereof and connected at the other end thereof to the collector of said transistor, the ohmic value of said resistor being of sufficient magnitude to provide a sustaining current through said four-layer diode such that said four-layer diode cannot reset.

18. Apparatus according to claim 4 wherein said second timer comprises:
time-delay means for receiving a first input electrical signal and for providing an electrical signal in response thereto at the output terminal thereof a predetermined time after the receipt of said input signal; and
pulsing means connected with said time delay means and responsive to the output electrical signal thereof for providing a pulse at predetermined time intervals.

19. Apparatus according to claim 18 wherein said pulsing means includes:
a transistor; and
a four-layer diode, one end of said diode being connected to the base of said transistor and the other end of said diode being connected to the output terminal of said electrical time delay means, whereby said transistor is rendered conductive upon the discharge of current through said four-layer diode.

20. Apparatus according to claim 19 wherein said time delay means comprises:
a variable resistor connected at one end thereof to one end of said four-layer diode; and
a variable capacitor connected between ground and the common junction point of said variable resistor and said four-layer diode.

21. Apparatus according to claim 20 further including:
a first resistor for receiving a second input signal at one end thereof and connected at one end thereof to the collector of said transistor;
a capacitor connected at one end thereof to the collector of said transistor; and
a second resistor connected between ground and the other end of said capacitor.

22. Apparatus according to claim 21 further including first and second diodes, each of said diodes connected across said second resistor such that the polarity of said first diode is opposite from the polarity of said second diode.

23. Apparatus according to claim 22 wherein:
said capacitor and said first and second diodes comprise a pulse forming network; and
said variable resistance has an ohmic value of sufficient magnitude to limit the current through said four-layer diode thereby to permit said diode to reset.